US009885302B2

(12) United States Patent
De Smet et al.

(10) Patent No.: US 9,885,302 B2
(45) Date of Patent: Feb. 6, 2018

(54) METHOD FOR REGENERATING A $NO_x$ STORAGE CATALYTIC CONVERTER

(71) Applicant: Ford Global Technologies, LLC, Dearborn, MI (US)

(72) Inventors: Frederik De Smet, Genk (BE); Christian Winge Vigild, Aldenhoven (DE); Daniel Roettger, Eynatten (BE); Matthew Allen Schneider, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/096,650

(22) Filed: Apr. 12, 2016

(65) Prior Publication Data

US 2016/0312721 A1 Oct. 27, 2016

(30) Foreign Application Priority Data

Apr. 24, 2015 (DE) ........................ 10 2015 207 595

(51) Int. Cl.
| | |
|---|---|
| *F01N 3/00* | (2006.01) |
| *F02D 41/02* | (2006.01) |
| *F02D 17/02* | (2006.01) |
| *F02M 26/05* | (2016.01) |
| *F02D 41/00* | (2006.01) |
| *F01N 3/20* | (2006.01) |
| *F01N 3/08* | (2006.01) |

(52) U.S. Cl.
CPC ....... *F02D 41/0275* (2013.01); *F01N 3/0814* (2013.01); *F01N 3/0885* (2013.01); *F01N 3/2093* (2013.01); *F02D 17/02* (2013.01); *F02D 41/008* (2013.01); *F02D 41/0055* (2013.01); *F02D 41/0065* (2013.01); *F02D 41/0087* (2013.01); *F02M 26/05* (2016.02); *F01N 3/0842* (2013.01); *F01N 3/0871* (2013.01); *F01N 2570/14* (2013.01); *Y02T 10/47* (2013.01)

(58) Field of Classification Search
USPC ......... 60/274, 278, 280, 285, 286, 295, 297, 60/301
See application file for complete search history.

(56) References Cited

U.S. PATENT DOCUMENTS

| | | | | |
|---|---|---|---|---|
| 5,974,793 | A * | 11/1999 | Kinugasa | ........... B01D 53/9454 60/278 |
| 6,422,004 | B1 * | 7/2002 | Takami | ................. F01N 3/0842 60/285 |
| 6,732,506 | B2 | 5/2004 | Patterson et al. | |
| 6,860,101 | B2 * | 3/2005 | Kako | .................... F01N 3/0842 60/274 |
| 6,904,752 | B2 | 6/2005 | Foster et al. | |

(Continued)

*Primary Examiner* — Binh Q Tran
(74) *Attorney, Agent, or Firm* — Julia Voutyras; McCoy Russell LLP (57) ABSTRACT

Methods and systems are provided for regenerating a NOx storage catalytic converter of a multi-cylinder internal combustion engine comprising selectively switchable cylinders. During permissible engine operating conditions, the switchable cylinders may be deactivated in order to regenerate the NOx storage catalytic converter using the rich exhaust from the active cylinders blended with un-combusted gas from the deactivated cylinders.

19 Claims, 4 Drawing Sheets

(56) References Cited

U.S. PATENT DOCUMENTS

| | | | |
|---|---|---|---|
| 8,424,289 B2 * | 4/2013 | Narayanaswamy | F02D 41/0082 60/274 |
| 2003/0188527 A1 | 10/2003 | Patterson et al. | |
| 2011/0265454 A1 * | 11/2011 | Smith .................. | F01N 3/0842 60/274 |
| 2014/0026872 A1 | 1/2014 | Kerns et al. | |

* cited by examiner

METHOD FOR REGENERATING A $NO_x$ STORAGE CATALYTIC CONVERTER

CROSS-REFERENCE TO RELATED APPLICATION

This application claims priority to German Patent Application No. 102015207595.8, filed Apr. 24, 2015, the entire contents of which are hereby incorporated by reference for all purposes.

FIELD

The present description relates generally to system and methods for regenerating a $NO_x$ storage catalytic converter of an internal combustion engine comprising at least one switchable cylinder.

BACKGROUND/SUMMARY

Various approaches are provided for regenerating a $NO_x$ storage catalytic converter for an internal combustion engine. One example approach, as shown in U.S. Pat. No. 6,904,752 B2, comprises cylinder deactivation. The activated cylinder is operated here with a rich fuel-air mixture to achieve an enriched or rich exhaust gas composition for the purposes of the regeneration of the $NO_x$ storage catalytic converter. This ensures an increased exhaust gas temperature and also provides sufficient amounts of reaction partners for the oxides of nitrogen bound within the $NO_x$ storage catalytic converter.

In another example approach, an engine control system with which a multi-cylinder internal combustion engine can be operated is known from US 2003/0188527 A1. Therein, the inventors show that some of the cylinders can be deactivated, and in certain operating situations the internal combustion engine can be operated with a reduced number of active cylinders. During this time, for the purposes of the regeneration of a $NO_x$ storage catalytic converter, operating parameters of the active cylinders are adjusted such that the $NO_x$ storage catalytic converter is changed to a state that is suitable for regeneration.

In yet another example approach, an internal combustion engine and an operating method for the internal combustion engine are known from US 2014/0026872 A1, wherein some cylinders of the internal combustion engine can be deactivated as required and the engine continues to be operated during the deactivation with a remaining number of active cylinders. Control of inlet and exhaust valves of the deactivated cylinders is carried out such that the exhaust gas of the active cylinders can flow via a common exhaust manifold in the opposite direction from the outlet side of the deactivated cylinders to the inlet side of the deactivated cylinders. The exhaust gas flowing through the deactivated cylinders in the opposite direction can mix with the fresh gas for the active cylinders in the vicinity of a common inlet box. Exhaust gas recirculation thus actually takes place through the deactivated cylinders.

It is the object of the disclosure to describe a method with which $NO_x$ storage catalytic converters of lean burn engines can be efficiently regenerated under everyday operating conditions. For regeneration of a NOx storage catalytic converter of a lean burn engine it is necessary to pass a rich mixture with an excess of unburnt hydrocarbons and carbon monoxide to the $NO_x$ storage catalytic converter. This should in particular enable efficient regeneration at low loads. Furthermore, the torque output by the internal combustion engine during the transition phase from a lean burn mode to a rich burn mode for the purposes of the regeneration should be able to be operated in a controllable manner. Furthermore, high efficiency of the internal combustion engine should also be achievable during the regeneration phase and for preparation of the regeneration of the $NO_x$ storage catalytic converter. Furthermore, a time window necessary for the regeneration of the $NO_x$ storage catalytic converter should be able to be kept very short, which makes it necessary for the oxidation reaction for removing the oxides of nitrogen from the $NO_x$ storage catalytic converter to be able to proceed as quickly as possible.

The inventors herein have recognized the above issues and identified an approach by which the issues described above may be at least partly addressed. One example method for regenerating a NOx storage catalytic converter of a multi-cylinder internal combustion engine comprises deactivating at least one switchable cylinder of the internal combustion engine, maintaining at least one net valve and at least one exhaust valve of a deactivated cylinder partially open, routing a flow of fresh air through the deactivated cylinder, operating at least one active cylinder of the internal combustion engine; and routing a flow of exhaust gas from the active cylinder to the NOx storage catalytic converter, wherein during the regeneration of the NOx storage catalytic converter, a first part of an un-combusted gas emanating from the deactivated cylinder is added to the exhaust gas of the active cylinder, and a second part of the un-combusted gas is cooled via a cooling device and recirculated to the inlet side of the switchable cylinder and/or of the active cylinder.

A method for regenerating a NO storage catalytic converter of a multi-cylinder internal combustion engine comprising cylinder deactivation and comprising at least one cylinder that can be deactivated during the operation of the internal combustion engine comprises passing a flow of exhaust gas from the at least one non-deactivated (active) cylinder through the $NO_x$ storage catalytic converter, operating the at least one active cylinder of the internal combustion engine such that regeneration of the $NO_x$ storage catalytic converter can take place. During the period of cylinder deactivation of the at least one cylinder that can be deactivated, at least one inlet valve and at least one exhaust valve of the inactive cylinder are held at least partly open to enable a flow of fresh gas through the inactive cylinder; and a return flow of the un-combusted gas (fresh air) emanating from the inactive cylinders on the exhaust side back to the inlet side of the internal combustion engine. Admixing of at least a first part of the un-combusted gas recirculated to the inlet side of the at least one inactive cylinder and/or of the active cylinder(s) may take place. In addition, at least a second part of the un-combusted gas may be added to the exhaust gas of the at least one active cylinder.

A flow of exhaust gas through the NOx storage catalytic converter is reduced by the part of the un-combusted gas that is recirculated towards the catalytic converter. Owing to said reduction of the volumetric flow/mass flow through the $NO_x$ storage catalytic converter, the dwell period of the exhaust gas components of the remaining exhaust gas of the active/combusting cylinders in the $NO_x$ storage catalytic converter is extended, so that the redactions taking place in the $NO_x$ storage catalytic converter have more time available to proceed. Such a reduced space velocity improves the efficiency of regeneration of the $NO_x$ storage catalytic converter with rich exhaust gas.

Furthermore, there is a reduction in the amount of unburnt gas (un-combusted gas) in the exhaust system that exits the inactive cylinder(s). As a result, the concentration of the exhaust gas components that are necessary for the regeneration of the $NO_x$ storage catalytic converter is increased. With higher concentrations of said exhaust gas components, the chemical reactivity also increases, which overall causes an increase in the efficiency of regeneration of the $NO_x$ storage catalytic converter.

Due to a flow of the exhaust gas of the active cylinders through the $NO_x$ storage catalytic converter, the temperature of said exhaust gas in the $NO_x$ storage catalytic converter is higher, because said volumetric flow/mass flow is not diluted by un-combusted gases from inactive cylinders and thereby cooled. Because of said unwanted cooling by the un-combusted exhaust gases from the inactive cylinders, in the prior art with low loading on the internal combustion engine, the temperature of the exhaust gas flowing through the $NO_x$ storage catalytic converter is often too low to cause regeneration of the $NO_x$ storage catalytic converter. With the method according to the disclosure, a sufficiently high exhaust gas temperature is successfully achieved even for low engine loads, so even at low loads on the internal combustion engine, effective regeneration of the $NO_x$ storage catalytic converter is enabled.

Furthermore, with the method according to the disclosure, owing to the cylinder deactivation operation, remaining active cylinders may operate under greater load, which is usually effected with a richer mixture. Because individual cylinders are operated under higher load even at a lower total engine loading, the additional fuel cost to achieve a rich exhaust gas that is required for regeneration of the $NO_x$ storage catalytic converter is reduced. In the prior art, such an additional amount of fuel is usually added into the flow of exhaust gas downstream of the internal combustion engine by means of an additional injection device. This can be dispensed with when using the method according to the invention, or a significantly smaller amount of post-injection fuel can suffice to achieve effective regeneration of the $NO_x$ storage catalytic converter. This increases the overall efficiency of the internal combustion engine.

Furthermore, in the prior art it is often problematic to provide a well-controlled or accurately controllable exhaust gas composition for the regeneration of the $NO_x$ storage catalytic converter by means of post-injection. Since post-injection is no longer necessary for adjusting the exhaust gas composition with the method according to the disclosure, or has to be used to a significantly lesser extent, the exhaust gas composition is essentially predetermined by the exhaust gas emanating from the engine (from the active cylinders), it is simpler and more accurate to control and to adjust.

Furthermore, the composition of the rich exhaust gas that is necessary for the regeneration of the $NO_x$ storage catalytic converter during the regeneration phase can also be maintained better and in a simpler way with the method according to the disclosure.

A particular advantage of the method according to the disclosure is that, owing to the possibility of the metered addition of at least a part of the un-combusted gas that can be recirculated to the exhaust gas of the at least one active cylinder, the flexibility for adjusting and optimizing the exhaust gas temperature and the volumetric flow through the $NO_x$ storage catalytic converter during a regeneration phase of the $NO_x$ storage catalytic converter, and its optimization in said time period, are increased.

In an advantageous embodiment of the invention, at least the second part of the fresh gas emanating from the at least one inactive cylinder is controllably added from a recirculation line to the exhaust gas of the active cylinders upstream of the $NO_x$ storage catalytic converter in the direction of flow of the exhaust gas. With the said measure, the $NO_x$ storage catalytic converter is successfully provided on the input side with an optimized mixture of exhaust gas from the active cylinders and un-combusted gas exiting the inactive cylinders. Advantageously, such metered addition takes place at a sufficient distance upstream of the $NO_x$ storage catalytic converter in order to ensure adequate mixing of the exhaust gases from the active cylinders with the fresh gas emanating from the inactive cylinders.

In a particular embodiment of the method according to the disclosure, the un-combusted gas is controllably added to the exhaust gas of the active cylinders upstream of a turbine of a turbocharger. By this measure it is achieved that both exhaust gas components flow through the turbine of the turbocharger together, so that good mixing is achieved. On the other hand, the controllability of the exhaust gas properties of the exhaust gas composition that finally flows through the $NO_x$ storage catalytic converter is easier to influence or control if metered addition of the un-combusted gas already takes place in the "hot" exhaust system upstream of the turbocharger turbine.

In order to be able to provide a sufficiently rich exhaust gas composition for the regeneration of the $NO_x$ storage catalytic converter, it is recommended at least during the process according to the disclosure to operate the remaining active cylinders with a rich mixture, in particular with a mixture with air-fuel equivalence ratio $(\lambda)<1$.

According to a further advantageous embodiment of the invention, the un-combusted gas recirculated from the inactive cylinders, which is recirculated to the internal combustion engine on the inlet side, is cooled. This can in particular be necessary if for example there are inlet manifolds on the inlet side that cannot withstand the high gas temperatures. Furthermore, the fresh gas fed into the internal combustion engine is prevented from being heated in an unwanted manner.

In a further advantageous embodiment of the disclosure, more cylinders are deactivated with decreasing load or with decreasing revolution rate of the internal combustion engine. The result thereof is that in order to meet the current driver's wishes or the current loading of the internal combustion engine, the remaining active cylinders can be operated with a higher load and hence a richer mixture may be available in the exhaust gas (to be used for NOx storage catalytic converter regeneration).

In a further advantageous embodiment, fresh gas and exhaust gas or un-combusted gas emanating from inactive cylinders are conveyed to the cylinders that can be deactivated and the cylinders that cannot be deactivated separately from each other, at least in part and at least outside of the internal combustion engine. Said separation of the gas flows for example enables the un-combusted gas emanating from the inactive cylinders to be conveyed exclusively to the inactive cylinders on the engine inlet side or optionally, possibly by means of a suitable dosing valve, to also be mixed with the fresh gas for the active cylinders.

Advantageously, the metered addition of the un-combusted gas emanating from the at least one inactive cylinder to the exhaust gas of the active cylinder takes place on the outlet side by means of at least one valve device, for example a branching valve from the recirculation line into the exhaust system.

For example, the metered addition can take place continuously with a predetermined volumetric or mass flow.

Nevertheless, the metered addition can also take place by means of a non-controllable valve by clocking the "open" and "closed" valve positions.

Appropriately, the metered addition can be controlled and/or regulated such that operating parameters that are necessary for the regeneration of the $NO_x$ storage catalytic converter are held constant or almost constant at least for a period of time that is necessary for the regeneration of the $NO_x$ storage catalytic converter. One such operating parameter is for example the oxygen concentration in the exhaust gas that is flowing through the $NO_x$ storage catalytic converter. Other operating parameters can be the exhaust gas temperature and the volumetric flow/mass flow through the $NO_x$ storage catalytic converter.

In order to carry out the above mentioned method for $NO_x$ storage catalytic converter regeneration, a multi-cylinder internal combustion engine is comprising at least one cylinder that can be deactivated may be provided, wherein the switchable cylinder that can be deactivated comprises an inlet manifold and an exhaust manifold. The inlet manifold and the exhaust manifold are fluidically connected by means of a recirculation line, wherein at least in the deactivated state (inactive state of the switchable cylinder), the recirculation line can carry a flow of un-combusted gas that is flowing through the switchable cylinder. According to the disclosure, the recirculation line is connected by means of a metering line to an exhaust system of the internal combustion engine in which the $NO_x$ storage catalytic converter to be regenerated is disposed.

Appropriately, a valve device is provided, by means of which un-combusted gas emanating from the inactive cylinder(s) can be added to the flow of exhaust gas from the active cylinders in a controlled manner. In this case the valve device can be a continuously adjustable regulating valve, with which an optional component between 0 and 100% of the un-combusted gas emanating from the at least one inactive cylinder can be controllably added to the flow of exhaust gas from the active cylinders upstream of the $NO_x$ storage catalytic converter.

In order to provide separation of the gas flows to be conveyed if needed, cylinders that can be deactivated and cylinders that cannot be deactivated each comprise common inlet manifolds and/or exhaust manifolds that are separate from each other.

In order to achieve a further increase in the flexibility of the exhaust gas composition that is provided to the $NO_x$ storage catalytic converter, it can be advantageous to associate each switchable cylinder from other switchable cylinders with a recirculation line from the exhaust manifold thereof to the inlet manifold thereof, wherein a valve device is disposed in at least one of the recirculation lines from the switchable cylinders, by means of which metered addition of the fresh gas emanating from the switchable cylinders to the exhaust gas of the active cylinders is possible.

In the case of a plurality of recirculation lines, it can be advantageous to admix different gas flows from the inactive cylinders to the exhaust system or the exhaust gas from the active cylinders by means of separately activated or separately regulated valve devices.

A switching valve may be used to feed the un-combusted gas from the inactive cylinders either into the exhaust system or into the intake system based on the valve position. If necessary, a cooler for cooling the recirculated fresh gas can be provided in the at least one recirculation line.

Furthermore, the device for performing the method appropriately comprises a control system, by means of which the metered addition of the un-combusted gas emanating from the at least one inactive cylinder to the exhaust gas of the active cylinders can be controlled and/or regulated by means of the valve device.

DETAILED DESCRIPTION

Figure 1:
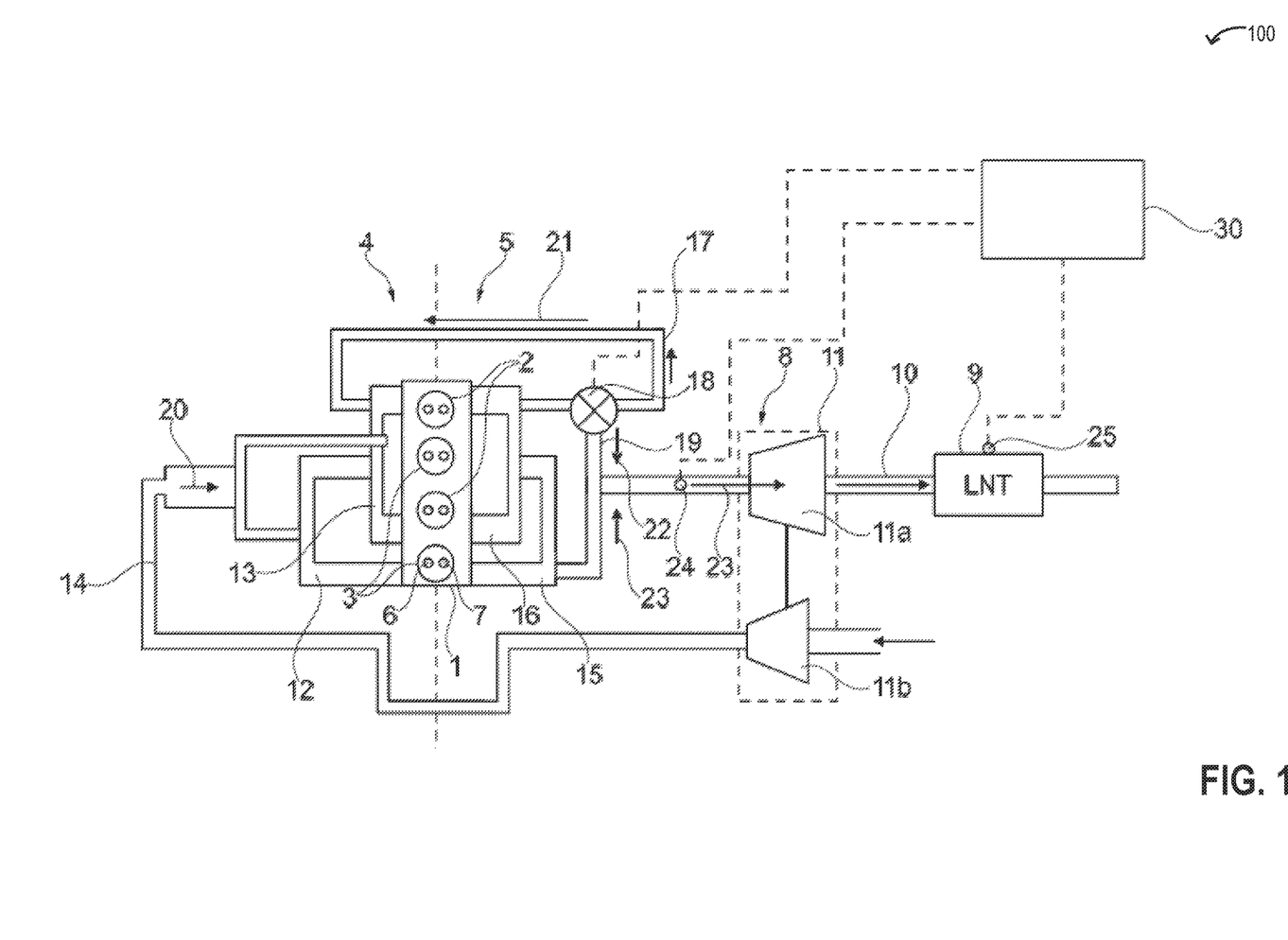
FIG. 1 shows an example first embodiment of an internal combustion engine according to the disclosure.

A first embodiment 100 of the internal combustion engine 1 according to the disclosure is shown in FIG. 1. A multi-cylinder internal combustion engine 1, in the exemplary embodiment a four-cylinder internal combustion engine, comprises at least one, in the exemplary embodiment two cylinders 2 that can be deactivated (switchable cylinders) and at least one, in the exemplary embodiment two, active cylinders 3. The internal combustion engine 1 comprises an inlet side 4 and an exhaust side 5. Each of the cylinders 2 and 3 comprise at least one inlet valve 6 and at least one exhaust valve 7. On the exhaust side, the internal combustion engine 1 comprises an exhaust system 8 in which is disposed a $NO_x$ storage catalytic converter 9 through which exhaust gas 10 can flow. A turbocharger 11 with a turbine 11a and a compressor 11b is disposed upstream of the $NO_x$ storage catalytic converter.

On the inlet side, the active cylinders 3 comprise a common first inlet manifold 12. The switchable cylinders 2 comprise a common second inlet manifold 13. The first and the second inlet manifolds 12, and 13 are fluidically connected to each other at a junction upstream of the cylinders 2, and 3. Both inlet manifolds 12, 13 are connected to a fresh gas feed line 14. The compressor 11b of the turbocharger 11 is disposed upstream in the fresh gas feed line 14. On the exhaust side, the active cylinders 3 comprise a common first exhaust manifold 15. On the exhaust side, the switchable cylinders 2 comprise a common second exhaust manifold 16. The second exhaust manifold 16 is connected by means of a recirculation line 17 to the second inlet manifold 13 of the switchable cylinders 2. Since the two inlet manifolds 12, and 13 are fluidically connected to each other, recirculated gas reaching the second inlet manifold 13 via the recirculation line 17 may also flow into through the first inlet manifold 12. In this way, recirculated gas from the switchable cylinders 2 may reach the active cylinders 3.

A valve device 18 that can be in the form of a switching valve or a dosing valve for example is disposed in the recirculation line 17. The valve device 18 is connected to the exhaust system 8 of the internal combustion engine 1 by means of a metering line 19. In addition, the internal combustion engine 1 comprises suitable devices (not shown) for holding the inlet valves 4 and the exhaust valves 5 of the cylinders 2 that can be deactivated at least partly open during a period of time during which the switchable cylinders 2 are deactivated, so that un-combusted (fresh) gas 20 can flow through the switchable cylinders 2 during the period of their deactivation. Fresh gas 20 in the fresh gas feed line 14 is under an overpressure that is produced by the compressor 11b with the device according to the invention, so that a flow of fresh gas 20 through the deactivated cylinders 2 is also possible if both their inlet valves 6 and also their exhaust valves 7 are open at the same time.

On the inlet side, the internal combustion engine 1 is provided with fresh gas 20 that is pre-compressed by the compressor 11b. The fresh gas 20 can flow through the switchable cylinders 2 during the period of their deactivation through the opened inlet valve 6 and exhaust valve 7. The un-combusted gas may pass through the switchable cylinders 2 and into the second exhaust manifold 16 of the switchable cylinders 2. The second exhaust manifold 16 is connected to the recirculation line 17, so that un-combusted gas 20 emanating from the deactivated cylinders 2 on the outlet side can be passed by means of the recirculation line 17 as a recirculation flow 21 to the second inlet manifold 13 of the switchable cylinders 2. A part of the recirculation flow 21 can be fed into the exhaust system 8 in a metered manner by means of the valve device 18. Said part of the recirculation flow 21 is referred to as a metered flow 22.

Combusted exhaust gas flowing out of the active cylinders 3, referred to below as a flow of exhaust gas 23, is also passed to the exhaust system 8. The flow of exhaust gas 23 and the metered flow 22 are thus combined in the exhaust system 8 to form the exhaust gas 10. The exhaust gas 10 passes through the turbine 11a of the turbocharger 11 and is expanded and cooled before it passes into the $NO_x$ storage catalytic converter 9. The oxygen concentration and hence the exhaust gas composition of the exhaust gas 10 can be determined by means of suitable sensors, for example a lambda probe 24. Appropriately, the $NO_x$ storage catalytic converter 9 comprises a temperature sensor 25, with which a temperature of the $NO_x$ storage catalytic converter 9, or alternatively or additionally a temperature of the exhaust gas 10 flowing through the $NO_x$ storage catalytic converter 9, can be determined. A control system 30 determines suitable values for the strength of the metering flow 22, for example using the measurement values of the lambda probe 24 and of the temperature sensor 25, and controls the valve device 18 such that the metered flow 22 is dimensioned such that optimal conditions are achieved for the regeneration of the $NO_x$ storage catalytic converter 9. Control system 30 may receive information from a plurality of sensors (examples of which are described herein) and send control signals to a plurality of actuators (examples of which are described herein). As one example, in addition to the above mentioned sensors, sensors may include MAP sensor, compressor inlet temperature sensor, compressor inlet pressure sensor, compressor inlet humidity sensor, and EGR sensor. Other sensors such as additional pressure, temperature, air/fuel ratio, and composition sensors may be coupled to various locations in engine system 1. The actuators may include, for example, valve device 18 throttle, wastegate, and fuel injector. The control system may include a controller. The controller may receive input data from the various sensors, process the input data, and trigger various actuators in response to the processed input data based on instruction or code programmed therein corresponding to one or more routines.

FIG. 1 shows the internal combustion engine according to the disclosure in an operating state in which switchable cylinders 2 are deactivated (inactive). In such a state, un-combusted gas emanating from the deactivated cylinders 2 is conveyed by means of the recirculation line 17 to the second inlet manifold 13 of the switchable cylinders 2. If the switchable cylinders 2 are not in the deactivated state, but are in the active state, combusted exhaust gas from the switchable cylinders 2 (now active) passes into the second exhaust manifold 16 of the switchable cylinders 2. Said exhaust gas is appropriately passed directly into the exhaust gas 10 without recirculation to the inlet side 4 along with the flow of the exhaust gas 23 of the active cylinders 3. For the case in which high pressure gas recirculation is desired, the recirculation line 17 and the valve device 18 can operate as an exhaust gas recirculation device for combusted exhaust gas from switchable cylinders 2 that are in active state.

Figure 2:
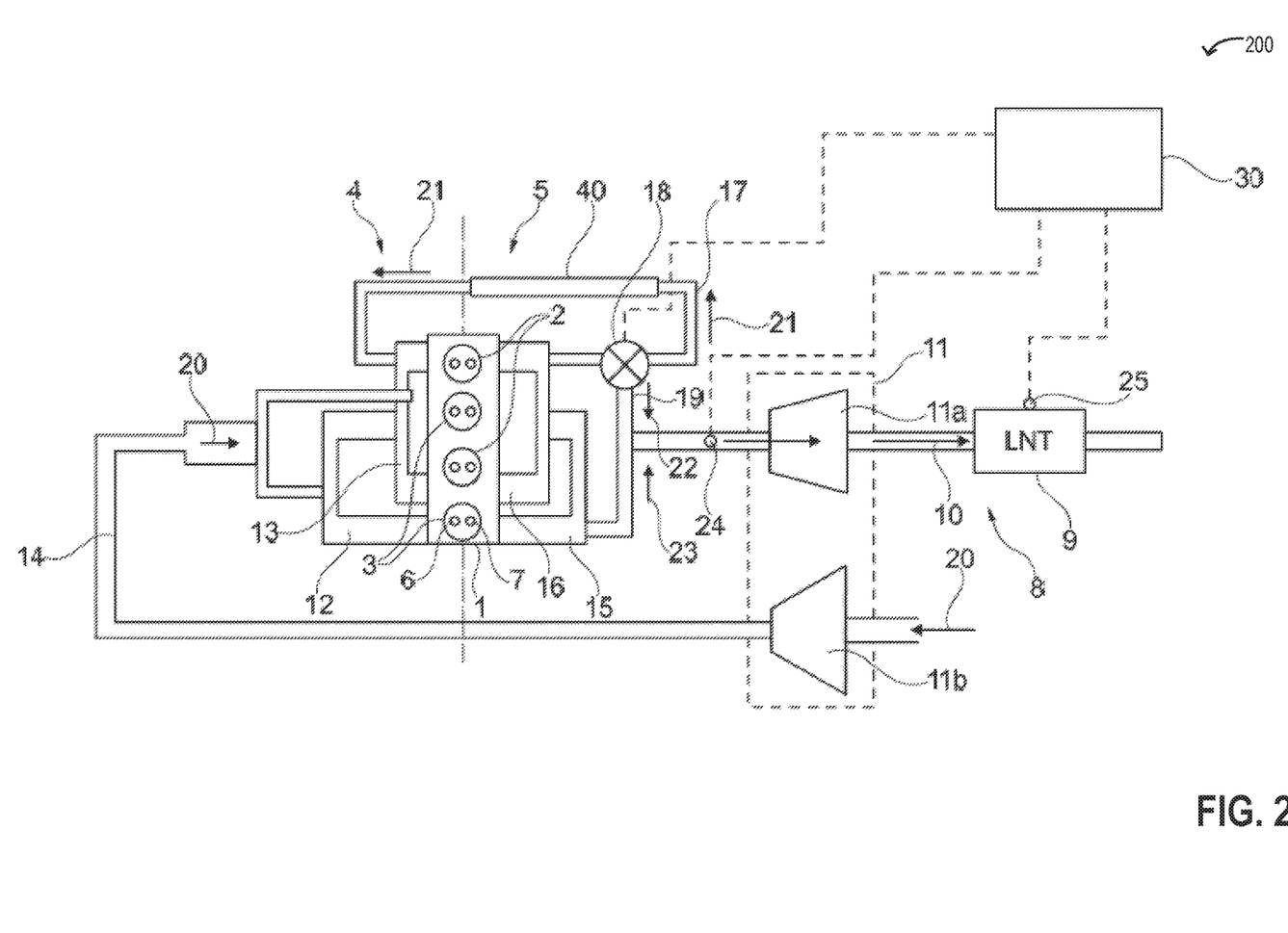
FIG. 2 shows an example second embodiment of an internal combustion engine according to the disclosure.

FIG. 2 shows a second embodiment 200 of the internal combustion engine 1 according to the disclosure. The features of the internal combustion engine 1 is described in relation to FIG. 1. Components previously introduced in FIG. 1 are numbered similarly and not reintroduced. Descriptions that have been made in connection with the embodiment according to FIG. 1 also apply in full to the embodiment according to FIG. 2. As an addition to the embodiment according to FIG. 1, in the embodiment according to FIG. 2 a cooling device 40 with which the recirculation flow 21 can be cooled if needed is disposed in the recirculation line 17.

FIGS. 1-2 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example.

Figure 3:
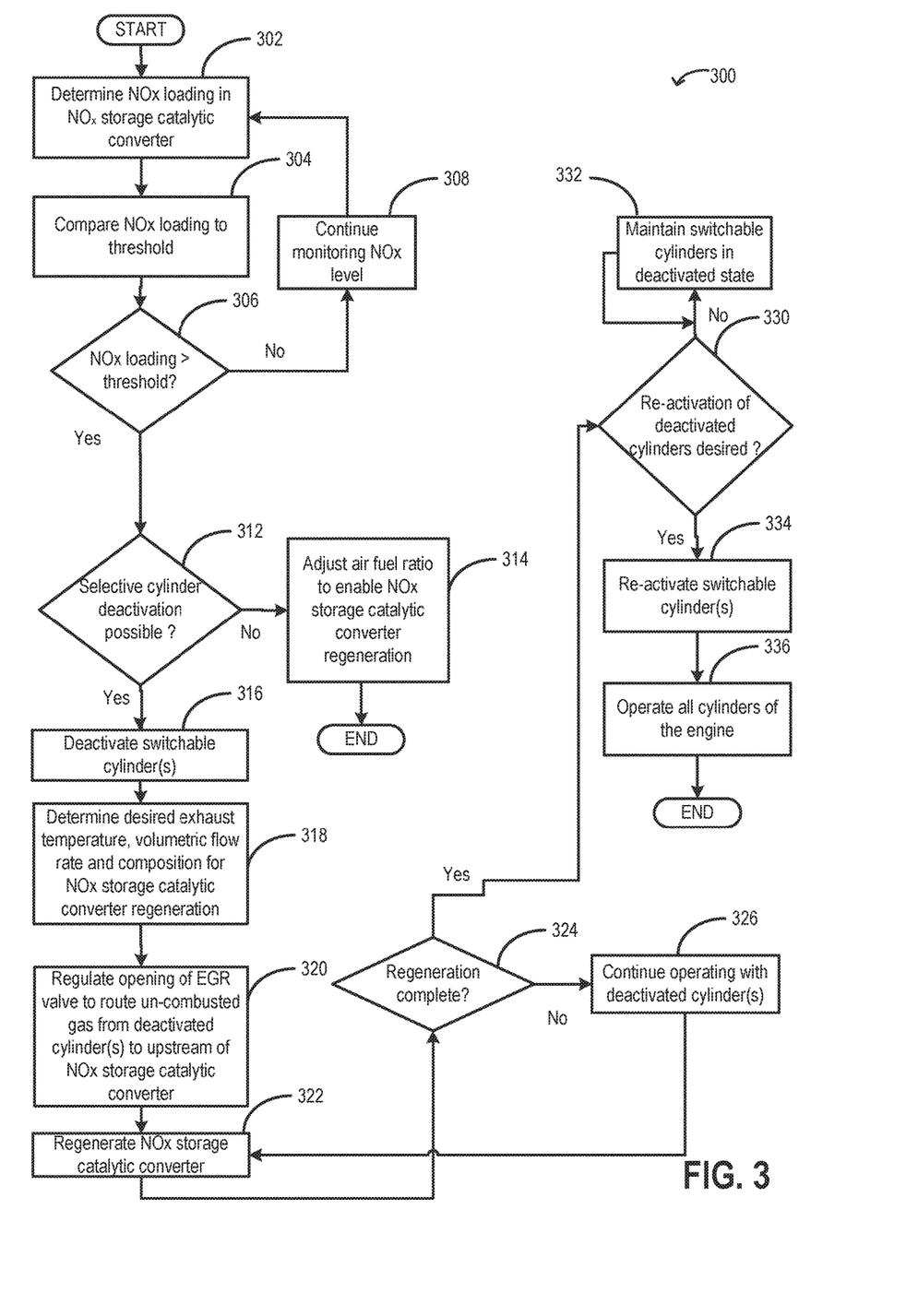
FIG. 3 shows a flow chart illustrating a method to be implemented for regeneration of a $NO_x$ storage catalytic converter.

FIG. 3 illustrates an example method 300 to be implemented for regeneration of a $NO_x$ storage catalytic converter. Instructions for carrying out method 300 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 302, a NOx loading in the $NO_x$ storage catalytic converter may be determined. In one example, the NOx loading may be determined based on the output of a pressure sensor coupled to the $NO_x$ storage catalytic converter (e.g., an exhaust pressure sensor coupled upstream or downstream of the converter). As another example, the NOx loading may be determined based on the output of a NOx sensor coupled to the catalytic converter. At 304, the determined NOx loading may be compared to a first upper threshold loading. In order to maintain efficiency of the $NO_x$ storage catalytic converter, the catalytic converter may be regenerated (purged) once the NOx loading exceeds the first upper threshold loading. At 306, the routine includes determining if the current NOx loading in the $NO_x$ storage catalytic converter is higher than the threshold loading. If it is determined that the current NOx loading is lower than the first upper threshold, at 308, monitoring of NOx level in the catalytic converter may be continued.

If it is determined that the current NOx loading is higher than the first upper threshold, engine operating conditions may be estimated and at 312 it may be determined if selective cylinder deactivation is possible. For example, engine operating conditions may be estimated based on measurements from MAP sensors, lambda sensors, and other sensors described with reference to FIG. 1. Engine operating parameters estimated may include engine load, driver demand, engine speed, air-fuel ratio, exhaust gas temperature, and exhaust gas oxygen content. In addition, based on engine operating parameters and/or available route information (obtained from navigation system, on-board map, etc.), it may also be determined if there is an upcoming opportunity for selective cylinder deactivation. The internal combustion engine of the given vehicle may comprise at least one switchable cylinder that may be selectively deactivated during suitable engine operating conditions such as during low load conditions. By selectively deactivating the switchable cylinders, remaining active cylinders may be operated at higher average cylinder loads, reducing pumping losses. Herein the inventors have recognized that by utilizing a rich exhaust (higher fuel content) emitted by the active cylinders during selective cylinder deactivation (even during low load conditions) may be effectively used for regenerating the NOx loading of the catalytic converter.

If it is determined that selective cylinder deactivation conditions are not met and there is no upcoming possibility for cylinder deactivation, at 314, air fuel ratio in the engine cylinders may be adjusted to enable regeneration of the NOx storage catalytic converter. For optimal catalyst regeneration, a richer than stoichiometry exhaust gas (with a higher fuel content) may be desired at the catalyst. In order to facilitate a richer exhaust gas reaching the catalyst, excess fuel (air fuel ratio higher than stoichiometry) may be injected to the cylinders.

If it is determined that selective deactivation of switchable cylinders is possible, at 316, at least one of the switchable cylinders may be deactivated. During cylinder deactivation, the controller may send a signal to the fuel injectors supplying fuel to these cylinders to suspend fueling for the duration of the cylinder deactivation. The number of cylinders to be deactivated may depend on the current engine operating conditions. As one example, as the engine load decreases, the number of cylinders that may be deactivated is increased. If an engine is operated with fewer number of cylinders, a richer than stoichiometry (that is, having a relatively higher fuel content) exhaust gas may be generated from the active cylinders even at low load conditions. During deactivation of the switchable cylinders, the intake and exhaust valves of the deactivated cylinders may be maintained in an at least partially open position in order to facilitate passage of un-combusted gas through the deactivated cylinder(s). A first portion of the un-combusted gas may be recirculated via an exhaust gas recirculation (EGR) system to the intake manifold of either the active cylinders or back to the intake manifold of the deactivated cylinders. A second metered portion of the recirculated un-combusted gas may also be added to the main exhaust passage. By adding a regulated portion of un-combusted gas, exhaust gas temperature, volumetric exhaust flow rate, and exhaust composition (e.g., fuel content, and oxygen content) may be adjusted based on the requirements for optimal NOx catalytic converter regeneration. Also, by adjusting the flow rate of the un-combusted gas, desired exhaust gas temperature, composition and flow rate (reaching the NOx catalytic converter) may be maintained (at a constant level) throughout the regeneration process. A ratio of the first part and the second part is adjusted based on one or more of a temperature, volumetric flow rate, oxygen content, and fuel content of exhaust gas reaching the NOx storage catalytic converter, wherein the ratio is increased based on one or more of an increase in temperature, decrease in volumetric flow rate, decrease in oxygen content, and increase in fuel content of exhaust emanating from the active cylinder At 318, target exhaust settings may be determined based on the higher than threshold NOx loading of the catalytic converter. For example, a desired exhaust gas temperature, volumetric exhaust flow rate, and exhaust composition (including fuel content, and oxygen content) facilitating NOx storage catalytic converter regeneration may be determined. At the desired exhaust gas temperature and composition, optimal regeneration of NOx converter may take place. In one example, as the NOx loading increases, the target exhaust temperature and exhaust flow rate may be increased. As another example, as the NOx loading exceeds the threshold, a degree of richness of the exhaust may be increased.

At 320, EGR settings may be adjusted based on the desired exhaust temperature, flow rate, and composition such that the exhaust gas reaching the NOx catalytic converter may be optimized for catalyst regeneration. For example, the controller may send a signal to an actuator coupled to an EGR valve (such as the valve device 18 as shown in FIG. 1) of the EGR system of the switchable cylinders in order to regulate an opening of the EGR valve such that a metered amount of un-combusted gas may be routed from the deactivated cylinder(s) to the main exhaust passage upstream of the NOx storage catalytic converter and also upstream of the exhaust turbine. Based on the desired exhaust temperature, volumetric flow rate and composition, the EGR valve opening may be adjusted (e.g., increased or decreased from an initial opening) to ensure a desired flow of un-combusted gas into the main exhaust passage. Also, the flow rate of the un-combusted gas entering the main exhaust passage may be maintained such that the operating parameters that are necessary for the regeneration of the NOx storage catalytic converter are maintained throughout the regeneration process. By adding the un-combusted gas upstream of the turbine, the gas may be well-mixed with the exhaust emitted from the active cylinders to create a uniform exhaust stream reaching the catalytic converter. Due to the cooler temperature of the un-combusted gas, by mixing an optimal portion of the un-combusted gas with the exhaust gas, exhaust gas temperature experienced at the NOx catalytic converter may be reduced if needed. Also the oxygen content of the exhaust gas reaching the catalytic converter may be altered by controlled addition of the un-combusted gas. Due to the selective deactivation of the switchable cylinder(s), the exhaust gas reaching the catalytic converter may be richer than stoichiometry (with a higher fuel content), thereby facilitating optimal catalytic converter regeneration. Said another way, adjusting the opening of the EGR valve is based on engine operating parameters of the active cylinder, the opening increased as one or more of a volumetric flow rate of exhaust from the active cylinder decreases, an oxygen content of exhaust from the active cylinder decreases, a temperature of exhaust from the active cylinder increases, and a fuel content of exhaust from the active cylinder increases, and the opening decreased based on one or more of an increase in volumetric flow rate, an increase in oxygen content, a decrease in temperature, and a decrease in fuel content of exhaust emanating from the active cylinder.

At 322, regeneration of the NOx storage catalytic converter may take place. During the regeneration event, the NOx trapped in the catalytic converter may be made to desorb and react with exhaust hydrocarbons under the rich exhaust conditions to produce water and nitrogen which may be released to the atmosphere via the tailpipe. The optimal temperature, fuel content, and oxygen content of the exhaust gas reaching the catalytic converter ensures removal of the stored NOx in the catalytic converter.

At 324, the routine determines if the regeneration process is complete. The regeneration process may be inferred as complete when the NOx loading of the NOx storage catalytic converter reaches a second lower threshold. If it is determined that the regeneration process is not complete, at 326, the engine may be continued to be operated with deactivated cylinders and the regeneration process may be continued.

If it is determined that the regeneration of the NOx storage catalytic converter is complete, at 330, the routine includes determining if cylinder reactivation conditions are met. Cylinder reactivation conditions may be confirmed, as one example, responsive to engine load being higher than a threshold load. If cylinder deactivation conditions are not met, at 332, the switchable cylinders may be maintained in the deactivated state.

If it is determined that reactivation of the deactivated cylinders is desired (for example during high engine load conditions), at 334, the switchable cylinders may be reactivated. Upon reactivation, the controller may send a signal to the fuel injectors coupled to the switchable cylinders to resume fuel supply to reactivated cylinders. Once the switchable cylinders are reactivated, at 336, all the cylinders of the engine may be operated.

In this way, switchable cylinders may be selectively deactivated and un-combusted gas from the deactivated cylinder(s) may be utilized for effective regeneration of a NOx storage catalytic converter.

Figure 4:
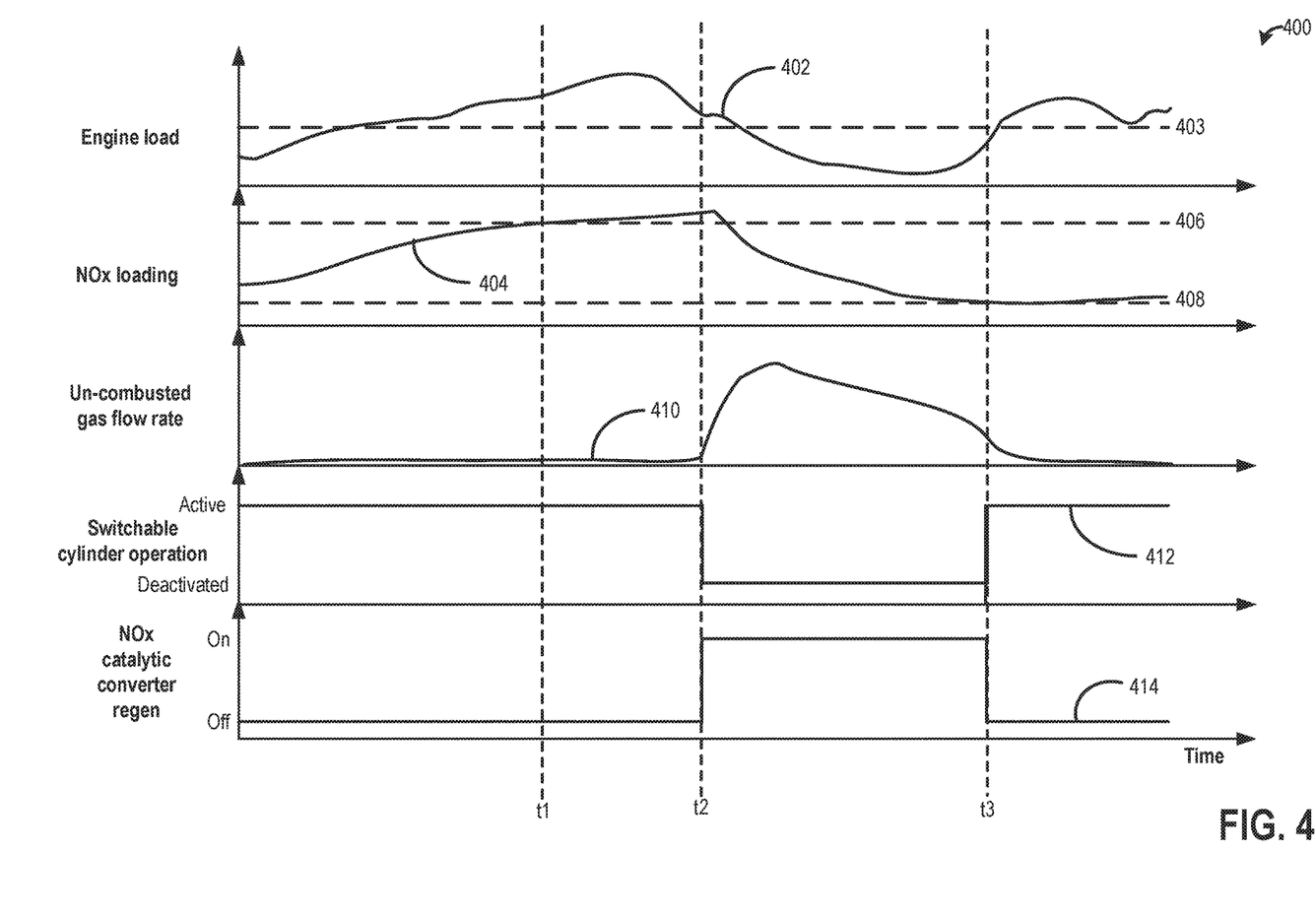
FIG. 4 shows an example regeneration of the $NO_x$ storage catalytic converter.

FIG. 4 shows an example operating sequence 400 illustrating selective cylinder deactivation and regeneration of a $NO_x$ storage catalytic converter based on a higher than threshold NOx loading in the catalytic converter. The horizontal (x-axis) denotes time and the vertical markers t1-t3 identify significant times in regeneration of the $NO_x$ storage catalytic converter.

The first plot from the top, line 402, shows variation in engine load over time. Dotted line 403 denotes a threshold engine load, wherein switchable cylinders may be selectively deactivated if engine load is below this threshold load. The second plot, line 404, shows an estimated NOx loading of the $NO_x$ storage catalytic converter. Dotted lines 406 and 408 respectively denote an upper and a lower threshold NOx loading. The catalytic converter may be regenerated once the NOx loading reaches the upper threshold and regeneration may be continued until the NOx loading falls to the lower threshold. The third plot, line 410, shows a variation in the flow rate of un-combusted gas from the deactivated cylinder to the main exhaust passage as regulated via a valve device (such as an exhaust gas recirculation valve). The fourth plot, line 412, shows switchable cylinder operation dependent on engine load and NOx storage catalytic converter regeneration. The final plot, line 414, shows NOx storage catalytic converter regeneration.

Prior to time t1, the engine load is observed to increase above the threshold load 403. During this time, all the cylinders including the switchable cylinder(s) are maintained in an active state. Due to NOx level below the upper NOx loading threshold, the catalytic converter is not regenerated at this time. Since the switchable cylinders are in an active state, there is no significant flow of un-combusted gas from the switchable cylinders to the exhaust passage.

At time t1, the engine is operated at a higher than threshold load 403. The high engine load may be due to increased driver torque demand. At this time, the NOx loading in the NOx storage catalytic converter may increase to a level higher than the upper threshold loading 406. Therefore, at this time, regeneration of the NOx storage catalytic converter may be desired. However for regeneration of the catalytic converter, it may be desired to selectively deactivate the switchable cylinders of the engine in order to generate a richer than stoichiometry (with a higher fuel content) exhaust gas from the active cylinders. The rich exhaust gas may react with the trapped NOx and reduce the NOx loading in the catalytic converter. At this time, it may be estimated based on engine operating parameters and/or available route information (obtained from navigation system, on-board map, etc.) that there is an upcoming opportunity (at time t2) for engine load reduction and selective cylinder deactivation. Based on the approaching engine operating conditions conducive for selective cylinder deactivation, catalytic converter regeneration may be deferred to time t2. However, if an upcoming opportunity for cylinder deactivation is not available, regeneration of the NOx storage catalytic converter may be initiated by injecting excess fuel to the cylinders in order to generate a richer than stoichiometry (higher fuel content) exhaust gas.

At time t2, the engine load is observed to decrease below the threshold load 403. At this permissible engine load, at least one switchable cylinder may be deactivated. Following the deactivation, fuel supply to the deactivated cylinder(s) may be suspended. However, during the deactivated state, the intake and exhaust valves of the deactivated cylinder(s) are maintained in a partially open position. Due to the deactivation of the switchable cylinder(s), the exhaust gas generated by the active cylinders has an air-fuel equivalence ratio ($\lambda$)<1. Owing to the opening of the intake and exhaust valves of the deactivated cylinder(s), un-combusted gas (fresh air) may flow through the deactivated cylinder(s) from the intake to the exhaust manifold. The un-combusted gas may be recirculated via a recirculation passage to the intake manifolds of either the active cylinders or the deactivated cylinders. A part of the un-combusted gas may also be introduced to the main exhaust passage upstream of the turbine and the NOx storage catalytic converter in order to dilute the exhaust gas exiting the active cylinders. At the turbine the un-combusted gas is well mixed with the exhaust gas exiting the active cylinders.

Between time t2 and t3, based on the desired temperature, volumetric flow rate and composition of exhaust gas reaching the catalytic converter (for optimal regeneration), an opening of a continually variable valve device may be adjusted to vary the flow rate of the un-combusted gas into the exhaust passage. Due to the low temperature of the un-combusted gas, by mixing this gas with the exhaust gas, the temperature of the hot exhaust gas exiting the active cylinders may be reduced to a desired level. Also the volumetric flow rate of the exhaust gas may be increased by the regulated addition of the un-combusted gas. Similarly, the oxygen content of the exhaust gas reaching the catalytic converter may be adjusted by regulating the flow rate of the un-combusted gas. At time t2, the regeneration of the NOx storage catalytic converter may be initiated. The optimally diluted rich exhaust gas (with un-combusted gas) reaching the catalytic converter may carry out the regeneration process. During the regeneration process, the NOx trapped in the catalytic converter may be made to desorb and react with hydrocarbons and fuel present in the rich exhaust gas to produce water and nitrogen which may be released to the atmosphere via the tailpipe.

As the regeneration process is continued, between time t2 and t3, the NOx loading at the NOx storage catalytic converter may decrease until it reaches the lower threshold NOx loading 408. At time t3, upon reaching the lower threshold NOx loading 408, the catalytic converter may be considered substantially purged and the regeneration process may be suspended. At this time, the engine load is seen to increase above the threshold load 403. Also, as the regeneration process is complete, the switchable cylinders may be reactivated and fuel supply to the switchable cylinders may be resumed. Once all the cylinders start operating, un-combusted gas may no longer flow from the deactivated cylinders to the exhaust passage. After time t3, the engine is continued to be operated with all cylinders in the active state.

In this way, during permissible engine operating conditions, switchable cylinders may be deactivated in order to regenerate a NOx storage catalytic converter. Rich (high fuel content) exhaust gas from the active cylinders blended with un-combusted gas from the deactivated cylinders may be utilized for regeneration of the catalytic converter.

One example method for regenerating a NOx storage catalytic converter of a multi-cylinder internal combustion engine comprises deactivating at least one switchable cylinder of the internal combustion engine; maintaining at least one inlet valve and at least one exhaust valve of a deactivated cylinder partially open; routing a flow of fresh air through the deactivated cylinder; operating at least one active cylinder of the internal combustion engine; and routing a flow of exhaust gas from the active cylinder to the NOx storage catalytic converter; wherein during the regeneration of the NOx storage catalytic converter, a first part of an un-combusted gas emanating from the deactivated cylinder is added to the exhaust gas of the active cylinder, and a second part of the un-combusted gas is cooled via a cooling device and recirculated to the inlet side of the switchable cylinder and/or of the active cylinder. In the preceding example, additionally or optionally, the first part of the un-combusted gas emanating from a deactivated cylinder is metered and added from a recirculation line to the exhaust gas upstream of each of a turbine of a turbocharger and the NOx storage catalytic converter in a direction of flow of the exhaust gas. In any or all of the preceding examples, additionally or optionally, a ratio of the first part and the second part is adjusted based on one or more of a temperature, volumetric flow rate, oxygen content, and fuel content of exhaust gas reaching the NOx storage catalytic converter, wherein the ratio is increased based on one or more of an increase in temperature, decrease in volumetric flow rate, decrease in oxygen content, and increase in fuel content of exhaust emanating from the active cylinder. In any or all of the preceding examples, additionally or optionally, the operating at least one active cylinder of the internal combustion engine includes operating the active cylinder with a rich air-fuel mixture with air-fuel equivalence ratio greater than one. In any or all of the preceding examples, additionally or optionally, deactivating at least one switchable cylinder of the internal combustion engine includes increasing the number of deactivated cylinders based on a decrease in one or more of engine load and engine speed. In any or all of the preceding examples, additionally or optionally, one or more of fresh gas, exhaust gas and un-combusted gas emanating from the switchable cylinder are conveyed to inlet manifolds of each of the switchable cylinder and the active cylinder separately from each other at least in part. In any or all of the preceding examples, additionally or optionally, metered addition of un-combusted gas emanating from the deactivated cylinder on the exhaust side to the exhaust gas of the active cylinder takes place via at least one valve device. In any or all of the preceding examples, additionally or optionally, adjusting the ratio of the first part and the second part is carried out by changing the opening of the valve device, the ratio increased by increasing the opening and the ratio decreased by decreasing the opening. In any or all of the preceding examples, additionally or optionally, the metered addition is carried out while maintaining operating parameters for the regeneration of the NOx storage catalytic converter at least for a period of time that is necessary for the regeneration of the NOx storage catalytic converter, the operating parameters including at least one of an exhaust gas temperature, an oxygen content in the exhaust gas, a fuel content in the exhaust gas, and a volumetric flow rate of the exhaust gas.

In another example, an internal combustion engine system comprises at least one switchable cylinder that can be deactivated, wherein the switchable cylinder comprises an inlet manifold and an exhaust manifold; a recirculation line fluidically coupling the inlet manifold to the exhaust manifold of the switchable cylinder, wherein un-combusted gas can flow through the recirculation line at least in the deactivated state of the switchable cylinder; a metering line connecting the recirculation line to an exhaust system of the internal combustion engine in which a NOx storage catalytic converter is disposed; a valve device coupled to the recirculation line for adjusting flow of un-combusted gas emanating from the at least one switchable cylinder to a flow of exhaust gas; and a controller with computer readable instructions stored on non-transitory memory for: when NOx level in the NOx storage catalytic converter is higher than a threshold, selectively deactivating fuel for at least one switchable cylinder based on engine load; and regenerating the NOx storage catalytic converter using exhaust gas from at least one active cylinder and un-combusted gas from the at least one switchable cylinder. In the preceding example, additionally or optionally, the valve device is a continuously adjustable valve, and based on an opening of the valve device, a selected first fraction of the un-combusted gas emanating from the at least one switchable cylinder can be added to the flow of exhaust gas upstream of the NOx storage catalytic converter in a metered manner. Any or all of the preceding examples further comprises, additionally or optionally, adjusting an opening of the valve device to recirculate a second fraction of the un-combusted gas emanating from the at least one switchable cylinder to an intake manifold of one or more of an active cylinder and the switchable cylinder. In any or all of the preceding examples, additionally or optionally, the controller contains further instructions for adjusting a ratio of the first and the second fraction based on one or more of a temperature, an oxygen content, a volumetric flow rate, and a fuel content of exhaust gas reaching the NOx storage catalytic converter. In any or all of the preceding examples, additionally or optionally, adjusting the ratio includes increasing the ratio based on one or more of an increase in temperature, decrease in oxygen content, decrease in volumetric flow rate, and increase in fuel content of exhaust gas reaching the NOx storage catalytic converter, and decreasing the ratio based on one or more of a decrease in temperature, increase in oxygen content, increase in volumetric flow rate, and decrease in fuel content of exhaust gas reaching the NOx storage catalytic converter. In any or all of the preceding examples, additionally or optionally, each of the switchable cylinders and each of the active cylinders comprise common inlet manifolds and/or exhaust manifolds, and wherein the recirculation line may include a plurality of fluidically connected recirculation lines coupling the exhaust manifold to the intake manifold of each of the switchable cylinders and the active cylinders, wherein opening of the recirculation lines are regulated via separate valve devices.

In yet another example, a method for an engine comprises in response to a higher than threshold NOx loading of an exhaust catalyst, selectively deactivating fuel to a switchable engine cylinder while continuing to pump air through valves of the deactivated cylinder; and adjusting an opening of an exhaust gas recirculation (EGR) valve to mix un-combusted air from the deactivated cylinder with exhaust from an active cylinder to provide a richer than stoichiometry mixture at the catalyst. In the preceding example, additionally or optionally, the adjusting the opening of the EGR valve is based on engine operating parameters of the active cylinder, the opening increased as one or more of a volumetric flow rate of exhaust from the active cylinder decreases, an oxygen content of exhaust from the active cylinder decreases, a temperature of exhaust from the active cylinder increases, and a fuel content of exhaust from the active cylinder increases, and the opening decreased based on one or more of an increase in volumetric flow rate, an increase in oxygen content, a decrease in temperature, and a decrease in fuel content of exhaust emanating from the active cylinder. In any or all of the preceding examples, additionally or optionally, the EGR valve is coupled in a first recirculation line connecting an exhaust manifold of the switchable cylinder to each of an intake manifold of the active cylinder, an intake manifold of the switchable cylinder, and an exhaust passage housing the exhaust catalyst. Any or all of the preceding examples further comprises, additionally or optionally, recirculating exhaust from an exhaust manifold of the active cylinder to each of an intake manifold the active cylinder and an intake manifold of the switchable cylinder via a second recirculation line Any or all of the preceding examples further comprises, additionally or optionally, regenerating the catalyst using the richer than stoichiometry exhaust gas until the NOx loading is below the threshold, and then reactivating the switchable engine cylinder.

In this way by selectively deactivating switchable cylinders a rich exhaust gas may be generated even during low engine load conditions which may be utilized for regeneration of a NOx storage catalytic converter. By utilizing the rich exhaust gas, additional usage of fuel for catalytic converter regeneration may be reduced thereby improving fuel economy. The technical effect of adding a metered amount of un-combusted gas exiting the deactivated cylinders into the main exhaust passage upstream of the NOx storage catalytic converter is that exhaust gas temperature, flow rate, and oxygen content may be adjusted and maintained at a substantially constant level to optimally suit regeneration conditions of the catalytic converter.

The invention claimed is:

1. A method for regenerating a $NO_x$ storage catalytic converter of a multi-cylinder internal combustion engine, comprising:
    deactivating at least one switchable cylinder of the internal combustion engine;
    maintaining at least one inlet valve and at least one exhaust valve of a deactivated cylinder partially open;
    routing a flow of fresh air through the deactivated cylinder;
    operating at least one active cylinder of the internal combustion engine; and
    routing a flow of exhaust gas from the active cylinder to the $NO_x$ storage catalytic converter;
    wherein
        during the regeneration of the $NO_x$ storage catalytic converter, a first part of an un-combusted gas emanating from the deactivated cylinder is added to the exhaust gas of the active cylinder, and a second part of the un-combusted gas is routed downstream of an exhaust manifold of the switchable cylinder, cooled via a cooling device, and recirculated to an inlet side of the switchable cylinder downstream of an intake manifold branch structure that leads only to the switchable cylinder, and then to the active cylinder.

2. The method of claim 1, wherein the first part of the un-combusted gas emanating from the deactivated cylinder is metered and added from a recirculation line to the exhaust gas upstream of each of a turbine of a turbocharger and the $NO_x$ storage catalytic converter in a direction of flow of the exhaust gas.

3. The method of claim 1, wherein a ratio of the first part and the second part is adjusted based on one or more of a temperature, a volumetric flow rate, an oxygen content, and a fuel content of exhaust gas reaching the $NO_x$ storage catalytic converter, wherein the ratio is increased based on one or more of an increase in temperature, a decrease in volumetric flow rate, a decrease in oxygen content, and an increase in fuel content of exhaust emanating from the active cylinder.

4. The method of claim 1, wherein the operating at least one active cylinder of the internal combustion engine includes operating the active cylinder with a rich air-fuel mixture with air-fuel equivalence ratio greater than one.

5. The method of claim 1, wherein deactivating at least one switchable cylinder of the internal combustion engine includes increasing a number of deactivated cylinders based on a decrease in one or more of engine load and engine speed.

6. The method of claim 2, wherein a metered addition of un-combusted gas emanating from the deactivated cylinder on an exhaust side to the exhaust gas of the active cylinder takes place via at least one valve device.

7. The method of claim 6, wherein adjusting a ratio of the first part and the second part is carried out by changing an opening of the valve device, the ratio increased by increasing the opening and the ratio decreased by decreasing the opening.

8. The method of claim 2, wherein the metered addition is carried out while maintaining operating parameters for the regeneration of the NOx storage catalytic converter at least for a period of time that is necessary for the regeneration of the $NO_x$ storage catalytic converter, the operating parameters including at least one of an exhaust gas temperature, an oxygen content in the exhaust gas, a fuel content in the exhaust gas, and a volumetric flow rate of the exhaust gas.

9. An internal combustion engine system comprising:
    at least one switchable cylinder that is deactivatable, wherein the switchable cylinder comprises a second inlet manifold coupled downstream of a branching of a first inlet manifold of an active cylinder and a second exhaust manifold coupled upstream of a first exhaust manifold of the active cylinder;
    a recirculation line fluidically coupling the second inlet manifold to the second exhaust manifold of the switchable cylinder, wherein un-combusted gas flows from the second exhaust manifold through the recirculation line to the second inlet manifold at least in a deactivated state of the switchable cylinder;
    a metering line connecting the recirculation line to an exhaust system of the internal combustion engine in which a NOx storage catalytic converter is disposed;

a valve device coupled to the recirculation line for adjusting flow of un-combusted gas emanating from the at least one switchable cylinder to a flow of exhaust gas; and a controller with computer readable instructions stored on non-transitory memory for:
when NOx level in the NOx storage catalytic converter is higher than a threshold,
selectively deactivating fuel for at least one switchable cylinder based on engine load; and
regenerating the NOx storage catalytic converter using exhaust gas from at least one active cylinder and un-combusted gas from the at least one switchable cylinder.

10. The system of claim 9, wherein the valve device is a continuously adjustable valve, and based on an opening of the valve device, a selected first fraction of the un-combusted gas emanating from the at least one switchable cylinder can be added to the flow of exhaust gas upstream of the NOx storage catalytic converter in a metered manner.

11. The system of claim 9, further comprising adjusting an opening of the valve device to recirculate a second fraction of the un-combusted gas emanating from the at least one switchable cylinder to an intake manifold of one or more of the active cylinder and the switchable cylinder.

12. The system of claim 10, wherein the controller contains further instructions for adjusting a ratio of the first fraction and a second fraction of the un-combusted gas based on one or more of a temperature, an oxygen content, a volumetric flow rate, and a fuel content of exhaust gas reaching the NOx storage catalytic converter.

13. The system of claim 12, wherein adjusting the ratio includes increasing the ratio based on one or more of an increase in temperature, a decrease in oxygen content, a decrease in volumetric flow rate, and an increase in fuel content of exhaust gas reaching the NOx storage catalytic converter, and decreasing the ratio based on one or more of a decrease in temperature, an increase in oxygen content, an increase in volumetric flow rate, and a decrease in fuel content of exhaust gas reaching the NOx storage catalytic converter.

14. The system of claim 10, wherein each of the switchable cylinders and each of the active cylinders comprise common inlet manifolds and/or exhaust manifolds, and wherein the recirculation line may include a plurality of fluidically connected recirculation lines coupling the exhaust manifold to the intake manifold of each of the switchable cylinders and the active cylinders, wherein openings of the recirculation lines are regulated via separate valve devices.

15. A method for an engine, comprising:
in response to a higher than threshold NOx loading of an exhaust catalyst,
selectively deactivating fuel to a switchable engine cylinder while continuing to pump air through valves of the deactivated cylinder; and
adjusting an opening of an exhaust gas recirculation (EGR) valve positioned downstream of both the switchable cylinder and an active cylinder to mix un-combusted air from the deactivated cylinder with exhaust from the active cylinder to provide a richer than stoichiometry mixture at the catalyst.

16. The method of claim 15, wherein the adjusting the opening of the EGR valve is based on engine operating parameters of the active cylinder, the opening increased as one or more of a volumetric flow rate of exhaust from the active cylinder decreases, an oxygen content of exhaust from the active cylinder decreases, a temperature of exhaust from the active cylinder increases, and a fuel content of exhaust from the active cylinder increases.

17. The method of claim 15, wherein the EGR valve is coupled in a first recirculation line connecting an exhaust manifold of the switchable cylinder to each of an intake manifold of the active cylinder, an intake manifold of the switchable cylinder, and an exhaust passage housing the exhaust catalyst.

18. The method of claim 15, further comprising recirculating exhaust from an exhaust manifold of the active cylinder to each of an intake manifold of the active cylinder and an intake manifold of the switchable cylinder via a second recirculation line.

19. The method of claim 15, further comprising regenerating the catalyst using the richer than stoichiometry exhaust gas until the NOx loading is below the threshold, and then reactivating the switchable engine cylinder.

* * * * *